United States Patent
Yoon et al.

(10) Patent No.: US 12,466,384 B2
(45) Date of Patent: Nov. 11, 2025

(54) HYBRID ELECTRIC VEHICLE AND METHOD OF CONTROLLING STATE OF CHARGE FOR THE SAME

(71) Applicants: Hyundai Motor Company, Seoul (KR); Kia Corporation, Seoul (KR)

(72) Inventors: Hee Jung Yoon, Goyang-si (KR); Jee Wook Huh, Goyang-si (KR); Se Jun Park, Suwon-si (KR); Jong Hyuck Kim, Hwaseong-si (KR); Seung Han Lee, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 278 days.

(21) Appl. No.: 17/720,697

(22) Filed: Apr. 14, 2022

(65) Prior Publication Data
US 2022/0402478 A1 Dec. 22, 2022

(30) Foreign Application Priority Data
Jun. 21, 2021 (KR) .......................... 10-2021-0079906

(51) Int. Cl.
| | |
|---|---|
| B60W 20/13 | (2016.01) |
| B60L 50/60 | (2019.01) |
| B60L 53/65 | (2019.01) |
| B60L 53/66 | (2019.01) |
| B60L 58/12 | (2019.01) |
| G01C 21/34 | (2006.01) |

(52) U.S. Cl.
CPC .............. *B60W 20/13* (2016.01); *B60L 50/60* (2019.02); *B60L 53/65* (2019.02); *B60L 53/66* (2019.02); *B60L 58/12* (2019.02); *G01C 21/3469* (2013.01); *B60W 2510/242* (2013.01)

(58) Field of Classification Search
CPC . B60W 20/13; B60W 2510/242; B60L 50/60; B60L 53/66; B60L 58/12; B60L 53/65; G01C 21/3469
USPC ......................................................... 701/22
See application file for complete search history.

(56) References Cited

U.S. PATENT DOCUMENTS

| | | | | |
|---|---|---|---|---|
| 2007/0252552 | A1* | 11/2007 | Walrath | G06F 1/3212 320/107 |
| 2013/0127244 | A1* | 5/2013 | Handa | B60W 50/0097 307/9.1 |
| 2016/0273927 | A1* | 9/2016 | Kitajima | G01C 21/3415 |

(Continued)

FOREIGN PATENT DOCUMENTS

CN 112193426 A * 1/2021 ............. B64C 39/02

OTHER PUBLICATIONS

Chau, Overview of power management in hybrid electric vehicles, 2002, Pergamon, Elsevier, Energy Conversion and Management (Year: 2002).*

*Primary Examiner* — Matthias S Weisfeld
(74) *Attorney, Agent, or Firm* — SLATER MATSIL, LLP

(57) ABSTRACT

An embodiment method of controlling a state of charge of a vehicle includes receiving input of use information for driving an external device by power of a battery for driving an electric motor, determining expected power consumption of the external device based on the use information, determining a target state of charge based on the expected power consumption, and controlling a driving mode based on the target state of charge.

13 Claims, 7 Drawing Sheets

(56) References Cited

U.S. PATENT DOCUMENTS

2018/0178668 A1* 6/2018 Ichikawa .............. B60W 20/13
2020/0317074 A1* 10/2020 Miller .................... B60L 53/36

* cited by examiner

FIG. 4

| | V2L SCHEDULE INFORMATION | | |
|---|---|---|---|
| | DIRECT SETTING | | |
| DIVISION | | POWER CONSUMPTION (W) | EXPECTED USE TIME (H) |
| DEVICE1 : | | 150 | 3.5 |
| DEVICE2 : | | 30 | 6 |
| DEVICE ADDITION | | | |

| | | |
|---|---|---|
| 111 | V2L SCHEDULE INFORMATION | |
| | SIMPLE SETTING - LOAD CLASSIFICATION | |
| 510 | ● HIGH | – WHEN ELECTRIC HEATER OR COOKING EQUIPMENT IS USED AND TWO OR MORE NIGHTS ARE SCHEDULED |
| 520 | ○ MEDIUM | – WHEN ONE NIGHT OR LESS IS SCHEDULED EVEN THROUGH ELECTRIC HEATER OR COOKING EQUIPMENT IS USED, OR LOW-LOAD DEVICE IS USED FOR LESS THAN THREE NIGHTS |
| 530 | ○ LOW | – WHEN LOW-LOAD DEVICE IS USED FOR SHORT PERIOD |
| 540 | ○ NO SETTING | |

HYBRID ELECTRIC VEHICLE AND METHOD OF CONTROLLING STATE OF CHARGE FOR THE SAME

CROSS-REFERENCE TO RELATED APPLICATIONS

This application claims the benefit of Korean Patent Application No. 10-2021-0079906, filed on Jun. 21, 2021, which application is hereby incorporated herein by reference.

TECHNICAL FIELD

The present invention relates to a hybrid electric vehicle (HEV) and a method of controlling a state of charge (SOC) for the same.

BACKGROUND

An HEV generally refers to a vehicle that uses two power sources together, and the two power sources are mainly an engine and an electric motor. Such an HEV has been actively developed in recent years since the HEV not only has excellent fuel efficiency and excellent power performance but also is advantageous in reducing exhaust gas when compared to a vehicle having only an internal combustion engine.

Among HEVs, a plug-in HEV (PHEV) may charge a battery with external power through a charging plug. Therefore, the PHEV has a larger battery capacity than that of an HEV capable of only charging a battery using regenerative braking or engine power, and accordingly, the driving control form is usually different from that of a general HEV.

For example, in the case of the HEV, a driving mode is divided into an electric vehicle (EV) mode, in which only an electric motor is used for driving, and an HEV mode, in which an engine is mainly used. However, in the PHEV, in addition to such division, a driving mode may be divided into a charge depleting (CD) mode, in which an SOC is depleted, and a charge sustaining (CS) mode, in which the SOC is maintained.

A driving mode switch form of such a PHEV will be described with reference to FIG. 1.

FIG. 1 illustrates an example of a driving mode switch form of a general PHEV.

Referring to FIG. 1, the PHEV sets a predetermined mode switch criterion for the SOC (SOC 15% in FIG. 1), and the PHEV usually drives in the CD mode when a current SOC is greater than or equal to the corresponding criterion and drives in the CS mode when the current SOC is less than the corresponding criterion or a distance in which the PHEV may be driven only by the electric motor (AER: all electric range) becomes shorter than a remaining distance to a destination.

Meanwhile, recently, the number of users who enjoy camping using a vehicle (that is, installing a tent around the vehicle or connecting the vehicle and the tent) or camping in the form of staying in the vehicle has been increasing. In the case of a general internal combustion engine vehicle, an external device has been used through a 12V outlet that uses power of a storage battery. However, recently, with the introduction of vehicle to load (V2L) technology, it is possible to use power of a high-voltage battery of an electric vehicle.

However, when the PHEV is used for the above-described type of camping, since the battery capacity is usually smaller than that of a pure EV, it is difficult to fully use an external device when an SOC of the high-voltage battery at a destination is insufficient. In a severe case, there is a concern that the high-voltage battery may be discharged, causing problems in driving the vehicle to come back.

SUMMARY

The present invention relates to a hybrid electric vehicle (HEV) and a method of controlling a state of charge (SOC) for the same. Particular embodiments relate to an HEV capable of efficiently controlling a SOC of a battery for driving an electric motor when an external device is driven by power of the battery and the HEV comes back, and a method of controlling the SOC for the same.

Accordingly, embodiments of the present invention are directed to an HEV and a method of controlling an SOC for the same that substantially obviate one or more problems due to limitations and disadvantages of the related art.

An embodiment of the present invention provides an HEV capable of efficiently controlling an SOC of a battery for driving an electric motor when an external device is driven by power of the battery and the HEV comes back, and a method of controlling the SOC for the same.

Another embodiment of the present invention provides an HEV capable of controlling an SOC of a battery in consideration of whether charging is allowed at a place where an external device is to be used and expected power consumption of the external device, and a method of controlling the SOC for the same.

Additional advantages, objects, and features of embodiments of the invention will be set forth in part in the description which follows and in part will become apparent to those having ordinary skill in the art upon examination of the following or may be learned from practice of the invention. The objectives and other advantages of embodiments of the invention may be realized and attained by the structure particularly pointed out in the written description and claims hereof as well as the appended drawings.

To achieve these objects and other advantages and in accordance with the purpose of the invention, as embodied and broadly described herein, a method of controlling an SOC of an HEV includes receiving input of use information for driving at least one external device by power of a battery for driving an electric motor, determining expected power consumption of the at least one external device based on the use information, determining a target SOC based on the expected power consumption, and controlling a driving mode based on the target SOC.

In another embodiment of the present invention, an HEV includes an input unit configured to receive input of use information for driving at least one external device by power of a battery for driving an electric motor, a calculation unit configured to determine expected power consumption of the at least one external device based on the use information, a determination unit configured to determine a target SOC based on the expected power consumption, and a controller configured to control a driving mode based on the target SOC.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates an example of a configuration of a schedule direct input menu according to an embodiment of the present invention;

FIG. 5A illustrates an example of a configuration of a simple schedule setting menu according to an embodiment of the present invention;

DETAILED DESCRIPTION OF ILLUSTRATIVE EMBODIMENTS

Figure 1:
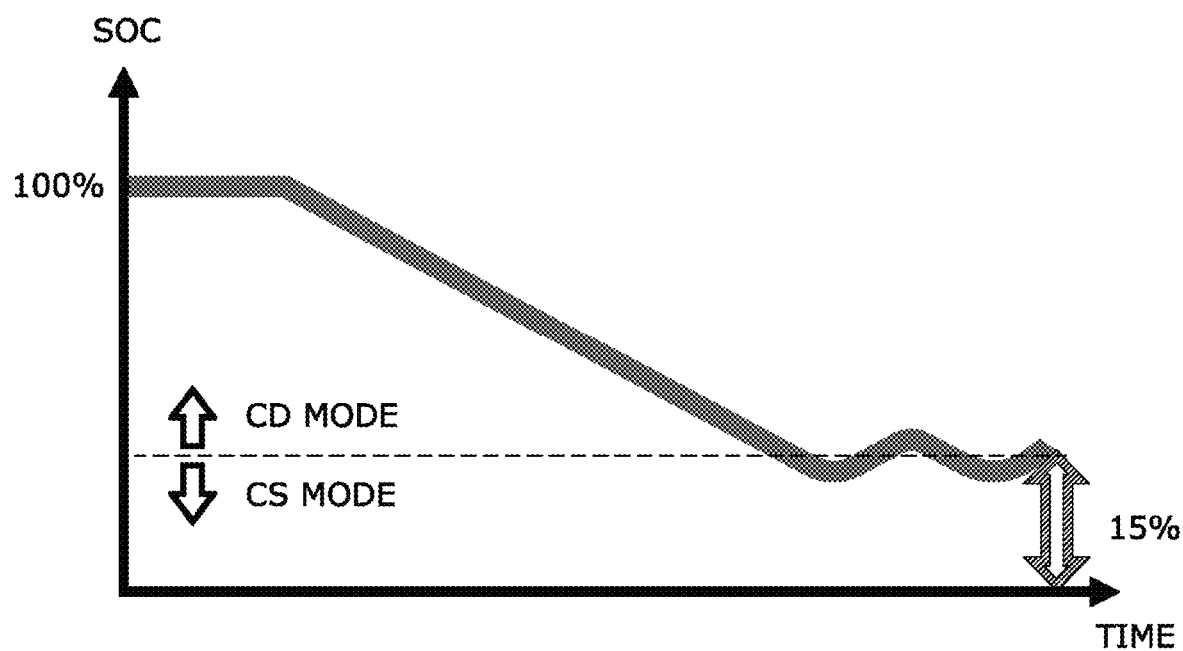
FIG. 1 illustrates an example of a driving mode switch form of a general PHEV.

Hereinafter, with reference to the accompanying drawings, embodiments of the present invention will be described in detail so that those of ordinary skill in the art may easily carry out the present invention. However, the present invention may be implemented in several different forms and is not limited to the embodiments described herein. Further, in order to clearly describe embodiments of the present invention in the drawings, parts irrelevant to the description are omitted, and similar reference symbols are attached to similar parts throughout the specification.

Throughout the specification, when a part "includes" a certain element, it means that other elements may be further included, rather than excluding other elements, unless otherwise stated. In addition, parts indicated by the same reference symbols throughout the specification refer to the same elements.

According to an embodiment of the present invention, when an external device is scheduled to be used after moving to a destination by an HEV, it is proposed to control an SOC of a battery in consideration of whether charging is allowed at the destination and expected power consumption of the external device.

Figure 2:
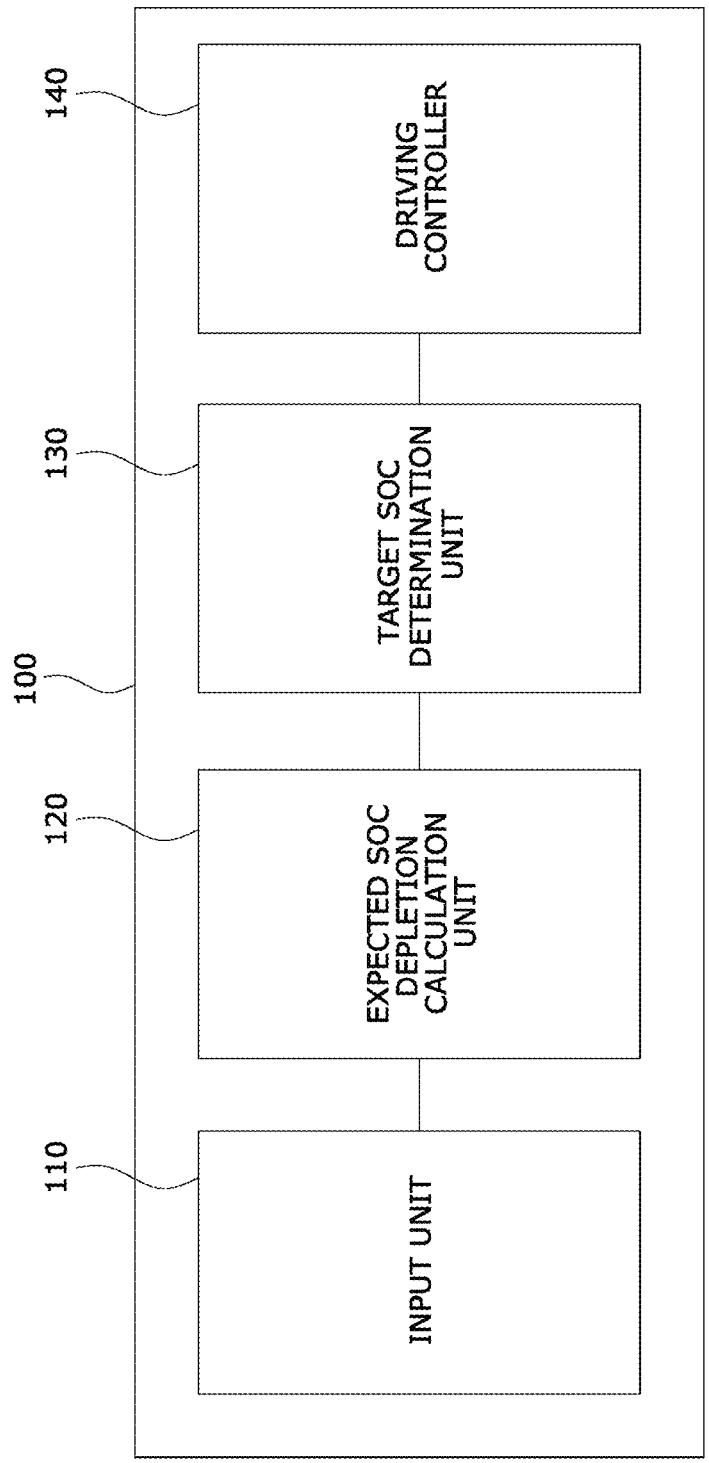
FIG. 2 is a block diagram illustrating an example of a configuration of an HEV according to an embodiment of the present invention.

FIG. 2 is a block diagram illustrating an example of a configuration of an HEV according to an embodiment of the present invention.

Referring to FIG. 2, an HEV 100 according to an embodiment may include an input unit 110, an expected SOC depletion calculation unit 120, a target SOC determination unit 130, and a driving controller 140.

Respective elements illustrated in FIG. 2 are mainly illustrated as elements related to embodiments of the present invention, and in actual implementation, it is apparent to those skilled in the art that it is possible to further include an electric motor, a powertrain such as an engine, and a control unit (for example, a motor control unit, an engine control unit, etc.) for individually controlling the powertrain.

First, the input unit 110 may receive, through a predetermined input device, input of information about a destination at which an external device is scheduled to be used, information about expected power consumption of the external device, etc., from a user. Here, the input device may include at least one of a touch screen, a touch pad, a key button, or a dial. However, these examples are illustrative, and the present invention is not limited to any type of input device as long as the input device is provided to the vehicle and may receive information from the user. For example, the input device may include a voice recognition device. In addition, the input unit 110 may further include an output device (for example, a display, a speaker, etc.) for outputting guide information for helping the user input information, a menu, or a user interface including the guide information and the menu in a predetermined form. A user interface for inputting specific information will be described later with reference to FIGS. 3 to 5.

The expected SOC depletion calculation unit 120 may determine the total amount of power to be consumed by the external device based on information input through the input unit 110, and convert the total amount of power into an SOC. In this instance, the total amount of power to be consumed by the external device may be a value converted into an SOC.

In the following description, use information such as information about a destination where the external device is scheduled to be used or information about expected power consumption of the external device may be input in the form of a schedule, and thus may be referred to as schedule information. However, this expression is for convenience of description and is not limited thereto, and it will be obvious that the use information of the external device at the destination may have a form other than the schedule.

For example, when the user individually inputs a use schedule of the external device, the total amount of power to be consumed by the external device may be obtained as an SOC as shown in the following Equation 1.

$$X1(\%) = A\,(\text{kWh}) * B(h)/1000/C\,(V)/D\,(\text{kWh}) * 100 \qquad \text{Equation 1}$$

In Equation 1, X1 denotes the total amount of expected power consumption (that is, expected SOC depletion) converted into an SOC when the user individually inputs a use schedule of the external device, A denotes power consumption of the external device, B denotes an expected use time at the destination, C denotes a nominal voltage of a high-voltage battery of the HEV, and D denotes a capacity of the high-voltage battery, respectively. However, Equation 1 is a calculation method for an individual external device. When a plurality of external devices is scheduled to be used, it is possible to apply a method in which the values 'A' and 'B' are input for each device to obtain the value X1 for each device, and then the values X1 for the respective devices are summed.

Contrary to the above description, when the user does not input the use schedule for each external device and inputs the approximate use amount in a form of selecting any one of a plurality of steps, the SOC corresponding to the input value may be treated as the total amount of power to be consumed by the external device.

The target SOC determination unit 130 may determine a target SOC based on information input through the input unit 110 and expected SOC depletion calculated by the expected SOC depletion calculation unit 120.

As an example, the target SOC determination unit 130 may determine the target SOC by adding an SOC corresponding to a main use region in an HEV mode to the expected SOC depletion. Here, the SOC corresponding to the main use region in the HEV mode may correspond to an SOC (for example, 15% in FIG. 1) serving as a mode switch criterion in FIG. 1 described above, but is not limited thereto.

As another example, when there is no charging facility at the destination in destination information input through the input unit 110 or when the user does not have the intention to charge even if there is a charging facility (that is, when charging of the battery is impossible), the target SOC determination unit 130 may add an offset to the target SOC determined in the above-described manner. Here, the offset may be determined in consideration of the SOC to be depleted by CD mode driving on a route coming back from the destination, or may be a preset value. On the other hand, when the destination has a charging facility and the user has the intention to charge through the charging facility, an offset may not be added. A reason therefor is that since the SOC to be depleted by CD mode driving on the route coming back from the destination may be replenished through charging at the destination, a larger SOC than that on a route moving from a starting place to the destination may be used for CD mode driving to reduce engine use.

The target SOC determination unit 130 may not perform correction such as adding an offset even when a destination is not set.

The driving controller 140 may control the driving mode of the HEV 100 so that the target SOC determined by the target SOC determination unit 130 may be ensured upon arrival at the destination.

For example, the driving controller 140 may perform a control operation so that the HEV 100 is driven in a CD mode from a time of departure, and when the SOC reaches the target SOC while driving, the target SOC becomes the main use region by switching to a CS mode. In this way, it is possible to ensure that the SOC equal to or larger than the target SOC remains in the battery until the destination is reached.

In actual real vehicle implementation, the input unit 110, the expected SOC depletion calculation unit 120, and the target SOC determination unit 130 may be implemented as an audio/video/navigation (AVN) system, and the driving controller 140 may be implemented as a hybrid control unit (HCU). However, this implementation is exemplary, and the present invention is not limited thereto. For example, only the input unit 110 may be implemented as the AVN system, and the expected SOC depletion calculation unit 120, the target SOC determination unit 130, and the driving controller 140 may be implemented as the HCU.

Figure 3:
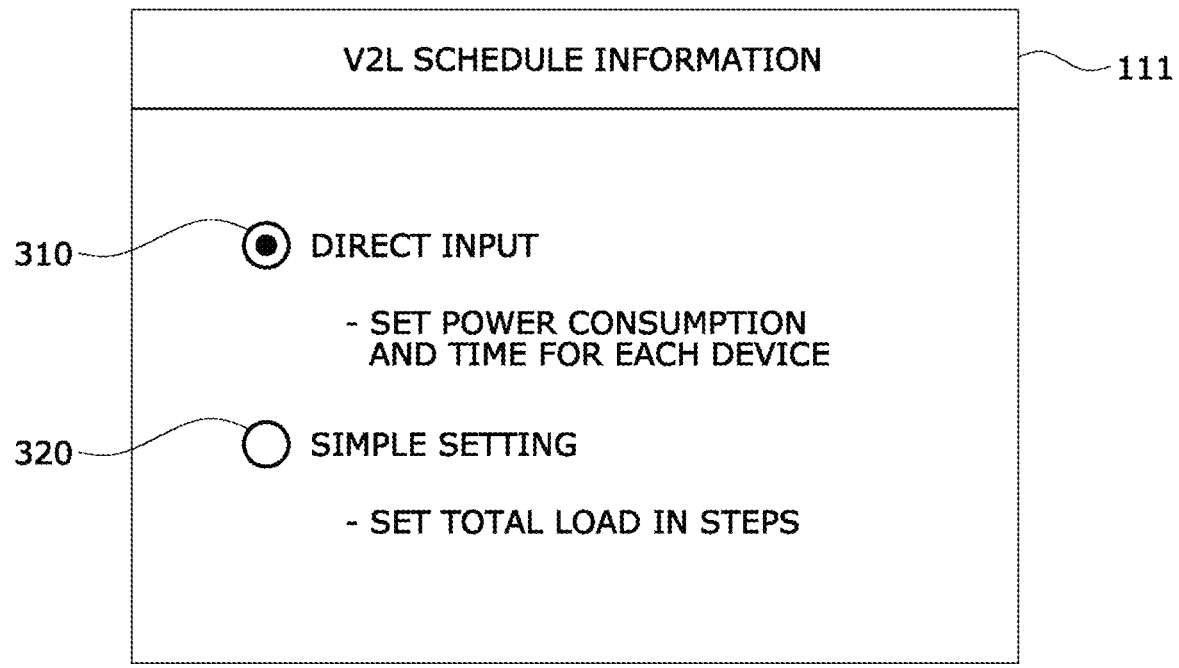
FIG. 3 illustrates an example of a configuration of a schedule information input menu according to an embodiment of the present invention.

FIG. 3 illustrates an example of a configuration of a schedule information input menu according to an embodiment of the present invention.

Referring to FIG. 3, a schedule information menu of a V2L function for supplying power of the high-voltage battery to the external device may be called on a display 111 of the AVN system through a predetermined menu operation. Here, a direct input item 310 and a simple setting item 320 may be displayed. The direct input item 310 is for inputting power consumption and an expected use time for each external device scheduled to be used, and the simple setting item is for selecting the total load to be used by the external device in a plurality of steps. A configuration of the direct input item 310 will be described in detail with reference to FIG. 4, and a configuration of the simple setting item 320 will be described with reference to FIG. 5A and FIG. 5B.

FIG. 4 illustrates an example of a configuration of a schedule direct input menu according to an embodiment of the present invention.

Referring to FIG. 4, the direct input menu is displayed on the display 111 of the AVN system. In the direct input menu, the user may directly input power consumption 410 and an expected use time 420 for each of at least one external device scheduled to be used at the destination. In addition, information about a new external device may be additionally input through a device addition item 430. The external device information input in this way may be used to calculate the expected SOC depletion through calculation shown in Equation 1 in the expected SOC depletion calculation unit 120.

FIG. 5A illustrates an example of a configuration of a simple schedule setting menu according to an embodiment of the present invention.

Referring to FIG. 5A, the simple schedule setting menu is displayed on the display 111 of the AVN system. In the simple setting menu, loads may be classified into a plurality of steps, for example, high 510, medium 520, and low 530, so that the user can select one thereof. Here, information for guiding selection may be output together as an example for each item.

Obviously, when no load setting is desired, an item of no setting 540 may be selected.

Figure 5B:
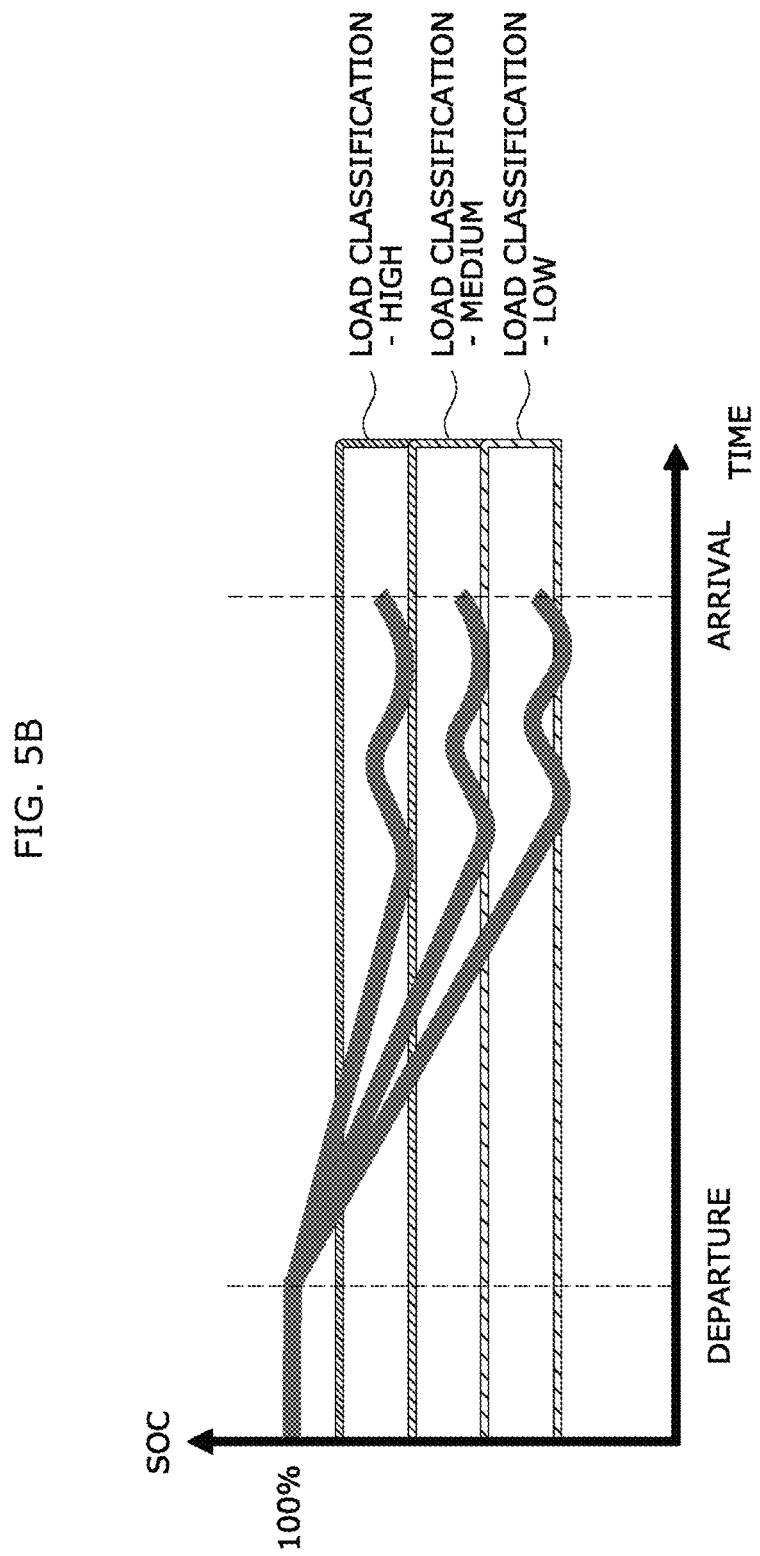
FIG. 5B illustrates an example of a form in which a target SOC is set by simple setting according to an embodiment of the present invention.

FIG. 5B illustrates an example of a form in which a target SOC is set by simple setting according to an embodiment of the present invention.

Referring to FIG. 5B, it may be seen that, as a higher step of load classification is set, a larger SOC is ensured at the destination.

Figure 6:
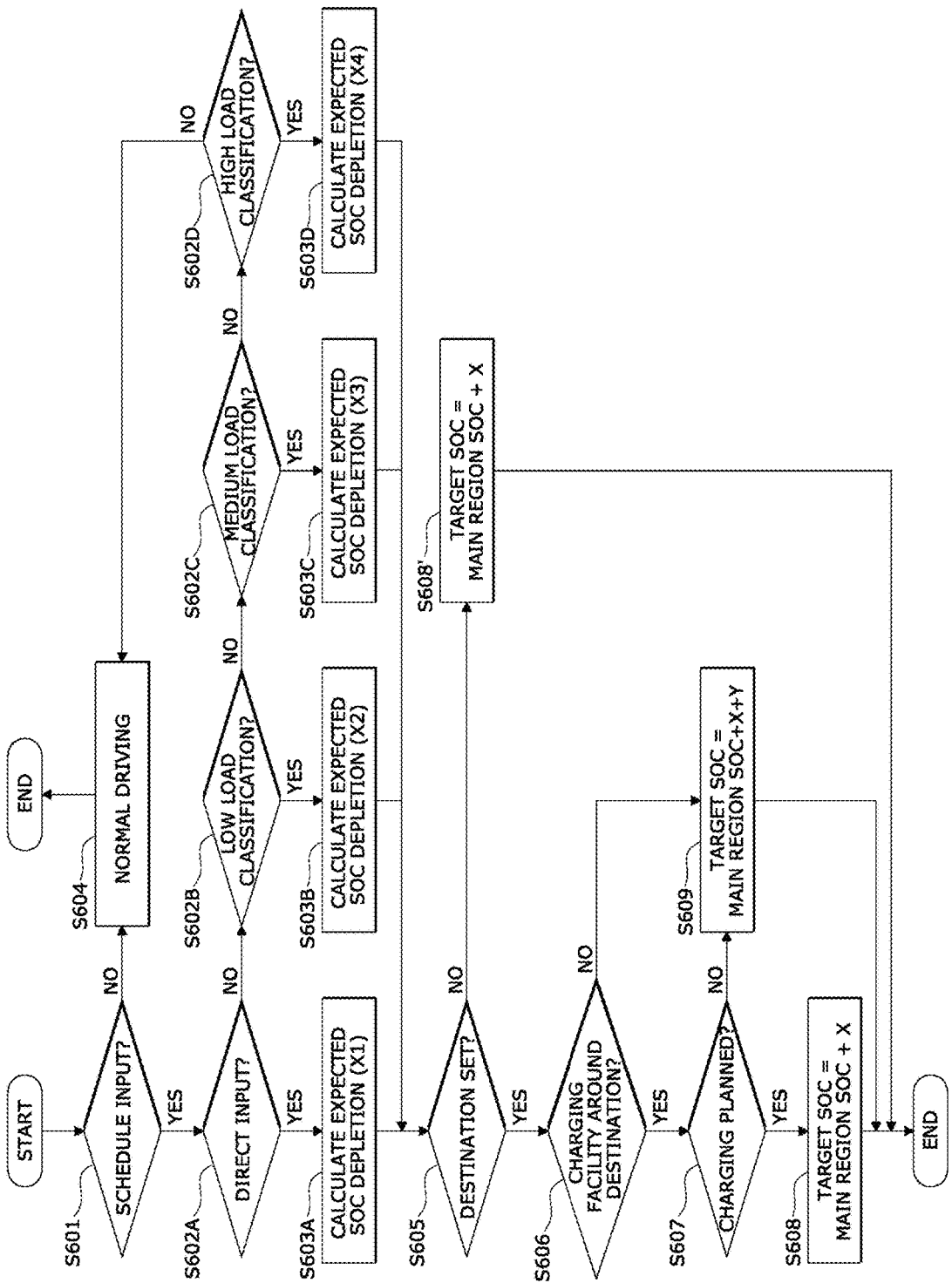
FIG. 6 is a flowchart illustrating an example of a target SOC setting process according to an embodiment of the present invention.

FIG. 6 is a flowchart illustrating an example of a target SOC setting process according to an embodiment of the present invention.

Referring to FIG. 6, when an external device is scheduled to be used at a destination, whether to input a schedule may be selected (S601). When the user selects to input the schedule (Yes in S601), it may be determined whether to directly input the schedule through a menu illustrated in FIG. 3 (S602A).

When the user does not select direct input (No in S602A), a plurality of options may be provided through a simple selection menu (S602B, S602C, and S602D).

In the case of direct input (Yes in S602A), first expected SOC depletion X1 may be calculated based on an input value (S603A), and when any one of a plurality of classified loads is selected through simple selection (Yes of S602B, Yes of S602C, or Yes of S602D), expected SOC depletion X2, X3, or X4 corresponding to the classified load selected may be determined (S603B, S603C, and S603D).

When "no setting" is selected from the simple selection menu (No in S602D) or when no schedule is input (No in S601), the HEV is driven according to default setting (S604).

Meanwhile, when the destination is set (Yes in S605), it may be determined whether there is a charging facility around the destination (S606). When there is a charging facility (Yes in S606), and the user has the intention (plan) to charge (Yes in S607), the target SOC may be determined as the sum of the expected SOC depletion (X, that is, any one of X1 to X4) and main use region SOC (S608). A reason therefor is that when charging is allowed at the destination, it is unnecessary to consider an SOC for coming back in reaching the destination as described above. When the destination is not set (No in S605), information about whether to perform charging cannot be obtained, and thus the target SOC may be determined as the sum of the expected SOC depletion X and the main use region SOC (S608').

On the other hand, when there is no charging facility around the destination (No in S606), or when there is no charging plan (No in S607) even though there is a charging facility (Yes in S606), the target SOC may be determined as the sum of the expected SOC depletion X, the main use region SOC, and an offset SOC Y (S609).

The present invention described above may be implemented as computer-readable code on a non-transitory medium in which a program is recorded. The computer-readable medium includes all types of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, etc.

The HEV according to at least one embodiment of the present invention configured as described above may efficiently control an SOC of a battery for driving an electric motor when an external device is driven by power of the battery and the HEV comes back.

In particular, embodiments of the present invention may control the SOC of the battery in consideration of whether charging is allowed at a place where the external device is to be used and expected power consumption of the external device. Accordingly, the external device may be sufficiently used at the scheduled place, and there is little risk of the battery being discharged when coming back.

The effects obtainable in embodiments of the present invention are not limited to the above-mentioned effects, and other effects not mentioned herein may be clearly understood by those of ordinary skill in the art to which the present invention belongs from the above description.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of controlling a state of charge of a vehicle, the method comprising:
    receiving input of use information for driving an external device by power of a battery for driving an electric motor;
    determining expected power consumption of the external device based on the use information;
    determining a target state of charge based on the expected power consumption; and
    controlling a driving mode based on the target state of charge,
    wherein:
        receiving the input of the use information includes receiving selection of any one of a plurality of preset simplified load classifications, each indicating a level of power consumption of the external device,
        the plurality of preset simplified load classifications based on power consumption comprise high step, medium step and low step,
        each step includes selection information for guiding the selection,
        the selection information is output for each step together as an example for each step,
        determining the expected power consumption comprises selecting at least one of the high step, the medium step, the low step,
        the determining the target state of charge includes:
            converting the expected power consumption into a state of charge value; and
            adding the converted state of charge value to a reference state of charge value to determine the target state of charge, and
        the reference state of charge value corresponds to a default value among switch criteria between a first driving mode, in which a state of charge of the battery is depleted, and a second driving mode, in which the state of charge is maintained,
    wherein the plurality of preset simplified load classifications comprises:
        the high step corresponding to use of a high-load device for two or more nights;
        the medium step corresponding to use of the high-load device for one night or less, or use of a low-load device for less than three nights; and
        the low step corresponding to use of the low-load device for one night or less, and
    wherein the preset simplified load classifications are based on both expected power consumption and expected duration of external device use.

2. The method according to claim 1, wherein receiving the input of the use information comprises receiving input of power consumption and an expected use time for the external device.

3. The method according to claim 1, wherein:
    in a case in which the battery is not allowed to be charged at a destination where the external device is scheduled to be driven, determining the target state of charge further comprises further adding an offset state of charge value to the converted state of charge value and the reference state of charge value to determine the target state of charge; and
    the destination is determined based on the use information.

4. The method according to claim 1, wherein a function of driving the external device by power of the battery comprises a vehicle to load function.

5. A non-transitory computer-readable recording medium recording a program for executing the method according to claim 1.

6. The method according to claim 1, wherein controlling the driving mode comprises setting the target state of charge as the switch criteria.

7. The method according to claim 1, wherein the reference state of charge value corresponds to a main use state of charge set as a default in a hybrid electric vehicle mode in which an engine is configured to be driven.

8. A hybrid electric vehicle comprising:
    an input unit configured to receive input of use information for driving an external device by power of a battery for driving an electric motor;
    a calculation unit configured to determine expected power consumption of the external device based on the use information;
    a determination unit configured to determine a target state of charge based on the expected power consumption; and
    a controller configured to control a driving mode based on the target state of charge,
    wherein:
        to receive the input of use information, the input unit is configured to receive a selection of any one of a plurality of preset simplified load classifications, each indicating a level of power consumption of the external device, the plurality of preset simplified load classifications based on power consumption includes high step, medium step and low step, each step includes selection information for guiding the selection, the selection information is output for each step together as an example for each step, to determine the expected power consumption, the calculation unit is configured to select at least one of the high step, the medium step, the low step, to determine the target state of charge, the determination unit is configured to:

convert the expected power consumption into a state of charge value; and add the converted state of charge value to a reference state of charge value to determine the target state of charge, and the reference state of charge value corresponds to a default value among switch criteria between a first driving mode, in which a state of charge of the battery is depleted, and a second driving mode, in which the state of charge is maintained, wherein the plurality of preset simplified load classifications comprises:

the high step corresponding to use of a high-load device for two or more nights, the medium step corresponding to use of the high-load device for one night or less, or use of a low-load device for less than three nights, and the low step corresponding to use of the low-load device for one night or less, and wherein the preset simplified load classifications are based on both expected power consumption and expected duration of external device use.

9. The hybrid electric vehicle according to claim 8, wherein the input unit is configured to receive input of power consumption and an expected use time for the external device.

10. The hybrid electric vehicle according to claim 8, wherein the controller is configured to set the target state of charge as the switch criteria.

11. The hybrid electric vehicle according to claim 8, wherein the reference state of charge value corresponds to a main use state of charge set as a default in a hybrid electric vehicle mode in which an engine is configured to be driven.

12. The hybrid electric vehicle according to claim 8, wherein:

in a case in which the battery is not allowed to be charged at a destination where the external device is scheduled to be driven, the determination unit is configured to further add an offset state of charge value to the converted state of charge value and the reference state of charge value to determine the target state of charge; and the destination is determined based on the use information.

13. The hybrid electric vehicle according to claim 8, wherein a function of driving the external device by power of the battery comprises a vehicle to load function.

* * * * *